(12) United States Patent
Quevallier (10) Patent No.: US 11,467,610 B2
(45) Date of Patent: Oct. 11, 2022

(54) THERMOSTATIC VALVE FOR MOTOR VEHICLE

(71) Applicant: NOVARES France, Clamart (FR)

(72) Inventor: Jean-Claude Quevallier, Lesquin (FR)

(73) Assignee: NOVARES FRANCE, Clamart (FR)

( * ) Notice: Subject to any disclaimer, the term of this patent is extended or adjusted under 35 U.S.C. 154(b) by 0 days.

(21) Appl. No.: 16/647,402

(22) PCT Filed: Sep. 21, 2018

(86) PCT No.: PCT/FR2018/052300
§ 371 (c)(1),
(2) Date: Mar. 13, 2020

(87) PCT Pub. No.: WO2019/058062
PCT Pub. Date: Mar. 28, 2019

(65) Prior Publication Data
US 2021/0124377 A1    Apr. 29, 2021

(30) Foreign Application Priority Data

Sep. 21, 2017   (FR) ..................................... 17/58763

(51) Int. Cl.
*G05D 23/02* (2006.01)
*G05D 23/13* (2006.01)
(Continued)

(52) U.S. Cl.
CPC ........... *G05D 23/1333* (2013.01); *F16K 3/24* (2013.01); *F16K 3/265* (2013.01); *G05D 23/022* (2013.01)

(58) Field of Classification Search
CPC ...... G05D 23/022; G05D 23/1333; F01P 7/16
See application file for complete search history.

(56) References Cited

U.S. PATENT DOCUMENTS

| 3,593,917 A | * | 7/1971 | Buisson ............... G05D 23/128 236/98 |
| 8,430,332 B2 |   | 4/2013 | Bouloy et al. |
| (Continued) |

FOREIGN PATENT DOCUMENTS

| CN | 1367888 A | 9/2002 |
| CN | 106286787 A | 1/2017 |
| (Continued) |

OTHER PUBLICATIONS

Written Opinion for Application No. PCT/FR2018/052300.
(Continued)

*Primary Examiner* — Jonathan Bradford
(74) *Attorney, Agent, or Firm* — Cantor Colburn LLP (57) ABSTRACT

A thermostatic valve including a closed hollow body, a first opening and a second opening in the body, a stopper separating the first opening from the second opening, a thermostatic actuator capable of opening the stopper and a biasing member capable of closing the stopper, wherein the stopper includes a movable cage capable of sliding in relation to a fixed cage along an axis substantially coinciding with the axis of the thermostatic actuator, the movable cage or the fixed cage having at least one port, and the relative movement of the movable cage in relation to the fixed cage allowing the at least one port (8, 80) to be selectively closed or opened, and in that the movable cage is made of plastics.

19 Claims, 6 Drawing Sheets

(51) Int. Cl.
*F16K 3/24* (2006.01)
*F16K 3/26* (2006.01)

(56) References Cited

U.S. PATENT DOCUMENTS

2013/0240634 A1* 9/2013 Auweder ................. F01P 7/16
236/34.5
2016/0109891 A1 4/2016 Watts

FOREIGN PATENT DOCUMENTS

| EP | 1659352 A2 | 5/2006 |
| FR | 2919704 A1 | 2/2009 |
| WO | 0102923 A1 | 1/2001 |
| WO | 2005052423 A1 | 6/2005 |
| WO | 2012036937 A2 | 3/2012 |

OTHER PUBLICATIONS

International Search Report for Application No. PCT/FR2018/052300.
CN First Search for Application No. 201880061692.7: dated Jun. 24, 2021.
CN Office Action for Application No. 201880061692.7: dated Jun. 30, 2021.
English Translation to CN Office Action for Application No. 201880061692.7: dated Jun. 30, 2021.

* cited by examiner

THERMOSTATIC VALVE FOR MOTOR VEHICLE

CROSS REFERENCE TO RELATED APPLICATIONS

This application is a National Stage of PCT Application No. PCT/FR2018/052300 filed on Sep. 21, 2018, which claims priority to French patent application FR17/58763 filed on Sep. 21, 2017, the contents each of which are incorporated herein by reference thereto.

TECHNICAL FIELD

The present invention concerns the field of thermostatic valves. A thermostatic valve is typically used in the field of automatic thermal regulation for fluid circuits (gas, water, oil, . . . ).

BACKGROUND

In a known manner, a thermostatic valve comprises a closed hollow body pierced with a first opening and a second opening and comprising a plug separating the two openings in a sealed manner. The plug is sensitive to the temperature of the fluid so as to open above a threshold temperature and to close below said threshold temperature.

An illustrative application in the automotive field is the making of water inlet cases (convergent) or water outlet case (divergent).

The plug of a thermostatic valve typically comprises a thermostatic actuator, such as a wax capsule, and a shutter actuated by the thermostatic actuator. The wax capsule comprises a cylinder filled with a wax sensitive to temperature. The wax repels a rod under the effect of a significant change in volume accompanying a change in solid/liquid phase, occurring at a threshold temperature or start of opening temperature.

Conventionally, the shutter or flap is disposed perpendicular to the axis of the thermostatic actuator. Such an arrangement is advantageous in that it is easy to achieve sealing of such a shutter at a reasonable cost. However, a drawback is that, in the presence of a difference between the pressures applied on one side and on the other side of the shutter, the thermostatic actuator must, during the opening of the flap, develop an additional force in order to overcome this pressure difference. This necessary additional force introduces a delay in opening equivalent to an increase in the threshold temperature. Also, the thermostatic valve has a sensitivity to the differential pressure modifying its threshold temperature.

Alternatively, it is also known to dispose the shutter or plunger parallel to the axis of the thermostatic actuator. Such an arrangement is advantageous in that in the presence of a differential pressure, the latter is perpendicular to the axis of the thermostatic actuator and thus produces substantially no force along the axis of the thermostatic actuator. However, a drawback is that the fit between the plunger and a corresponding sleeve must be accurate to ensure sealing. In addition, due to the accurate adjustment, the plunger rubs on the sleeve. Therefore, it must be made of a wear-resistant material. Also, all known devices of this type include a metal plunger made according to accurate tolerances, and most often a sleeve also made according to made tolerances. This implies a drastic increase in the cost of the thermostatic valve, restricting it for high pressure (heavy goods vehicle) or high performance (high-end vehicle) applications.

There is a need to provide a thermostatic valve that is barely sensitive to differential pressure and at low cost.

BRIEF SUMMARY

To this end, according to a first aspect, the invention relates to a thermostatic valve for a fluid circuit of a motor vehicle comprising a closed hollow body, a first opening and a second opening leading into the body, a plug separating the first opening from the second opening, a thermostatic actuator adapted to open the plug and a biasing means adapted to close the plug, where the plug comprises a movable cage adapted to slide relative to a fixed cage according to an axis substantially coincident with the axis of the thermostatic actuator, the movable cage or the fixed cage having at least one aperture, the relative displacement of the movable cage relative to the fixed cage allowing selectively sealing or clearing said at least one aperture and in that the movable cage is made of a plastic material. Such features advantageously allow making a thermostatic valve that is barely sensitive to differential pressure while guaranteeing a low manufacturing cost.

According to other features, the thermostatic valve of the invention includes one or more of the following optional features considered alone or in any possible combination:
- the movable cage is more flexible than the fixed cage and is disposed, with respect to the fixed cage, on the pressure side, so that the pressure presses the movable cage against the fixed cage,
- the movable cage comprises at least one longitudinal cutout and the fixed cage comprises a solid surface opposite said at least one longitudinal cutout,
- the body further comprises a conduit configured to be connected to the fluid circuit, the conduit leading to downstream of the thermostatic actuator,
- the fixed cage and/or the movable cage have substantially complementary frustoconical shapes,
- the movable cage is engaged on the internal face of the fixed cage and the fixed cage is provided with at least one aperture,
- the movable cage is engaged on the external face of the fixed cage and the fixed cage is provided with at least one aperture,
- said at least one aperture has a shape dependent of a desired opening law,
- said shape is preferably rectangular for a proportional law, triangular for a continuously varied law, or even stepped for a stepped flow law,
- the thermostatic valve also comprises a first static sealing means, such as an O-ring gasket, disposed, preferably axially, between the fixed cage and a first end of the movable cage and a second static sealing means, such as an O-ring gasket, disposed, preferably axially, between the fixed cage and an opposite second end of the plunger, so as to ensure a static sealing, the movable cage being in the closed position.

According to another aspect, the invention relates to a fluid inlet or fluid outlet case, for thermostatic regulation of a fluid circuit, comprising such a thermostatic valve.

BRIEF DESCRIPTION OF THE DRAWINGS

The invention will be better understood on reading the non-limiting description that follows of two embodiments, made with reference to the appended figures.

DETAILED DESCRIPTION

For simplification, elements that are found identically in the different embodiments of the invention bear identical reference numerals.

The invention concerns a thermostatic valve.

Figure 1:
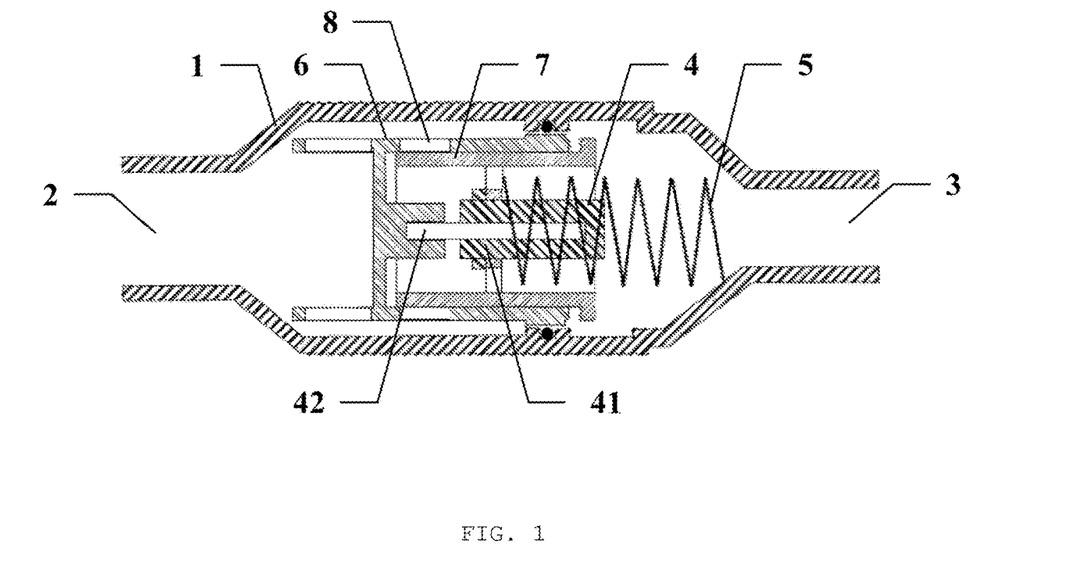
FIG. 1 shows in a schematic sectional view a thermostatic valve according to a first embodiment of the invention, in the closed position.
Figure 2:
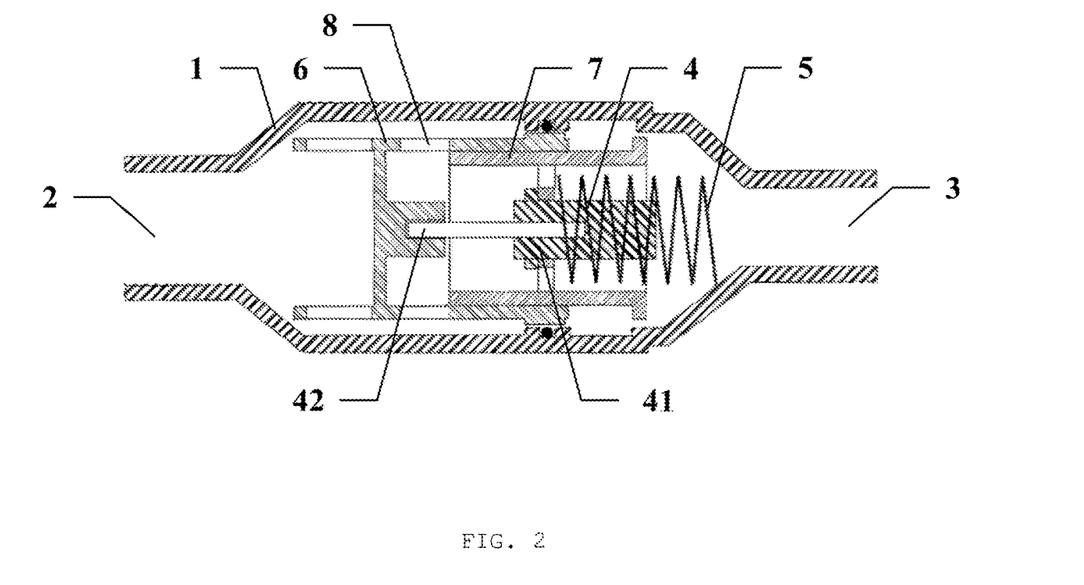
FIG. 2 shows the thermostatic valve of the previous figure in the open position.

As illustrated in FIGS. 1 and 2 in a first embodiment, such a thermostatic valve comprises, in a known manner, a hollow body 1 closed and pierced only with a first opening 2 and a second opening 3 both leading into the body 1. A plug separates the first opening 2 from the second opening 3 and can be selectively opened or closed. When the plug is closed, the first opening 2 is isolated from the second opening 3. When the plug is opened, the first opening 2 and the second opening 3 are in fluid communication. The thermostatic valve further comprises a thermostatic actuator 4 and an antagonistic biasing means or biasing member 5.

According to the invention, the plug comprises a fixed cage 6 pierced with at least one radial aperture 8 and a movable cage 7, substantially adjusted to the fixed cage 6 and adapted to slide relative to the fixed cage 6 so as to selectively seal or clear said at least one aperture 8. When the movable cage 7 seals said at least one aperture 8, as illustrated in FIG. 1, the plug and the thermostatic valve are closed. When the movable cage 7 clears said at least one aperture 8, as illustrated in FIG. 2, the plug and the thermostatic valve are open. The thermostatic actuator 4, and more particularly its body 41, is sensitive to temperature so that the thermostatic actuator 4 is deployed, by pushing a rod 42, when the temperature exceeds a threshold or start of opening temperature. During its deployment, it drives the movable cage 7, to the right in the plane of the figure, thus clearing the aperture(s) 8 and thereby opening the plug. On the contrary, when the temperature drops below the threshold temperature, the biasing means 5 pushes the rod 42 back into the body 41, brings the movable cage 7 back to the sealed position of the aperture(s) 8 and thus closes the plug.

According to an advantageous feature, the movable cage 7 slides relative to the fixed cage 6 according to an axis substantially coincident with the axis of the thermostatic actuator 4. The movable cage 7 is typically displaced in translation according to its axis. Thus, in the presence of a differential pressure between the two openings 2, 3, the force induced by this pressure is exerted perpendicular to the force exerted by the thermostatic actuator 4 and thus does not oppose its action and the opening of the plug. According to another advantageous feature, the movable cage 7, 70 is made of plastic, in order to offer a product of reasonable manufacturing cost.

The making of the movable cage 7 in plastic a material means a conventional manufacture, allowing for large series and reduced cost, such as for example by molding conventionally used in the plastics industry and according to conventional methods allowing standard tolerances to be reached. It follows that, on these bases, one skilled in the art does not know how to solve the sealing problems, at least not with the leakage levels necessary for the intended applications of thermostatic valves.

A first feature which will allow improving sealing until reaching the required low levels of leakage, is to make the movable cage 7 so that it is more flexible than the fixed cage 6. This feature of relative flexibility is further combined with a particular arrangement, according to which the movable cage 7 is disposed with respect to the fixed cage 6, on the pressure side. In most applications, and particularly those characterized in that a differential pressure arises, the pressure is higher on one side, of an opening 2, 3, and this side generally remains the same: one can thus call it the pressure side. In other words, the movable cage 7 is disposed inside the fixed cage 6 as illustrated in FIGS. 1, 2 when the pressure comes from the side of the second opening 3.

Figure 9:
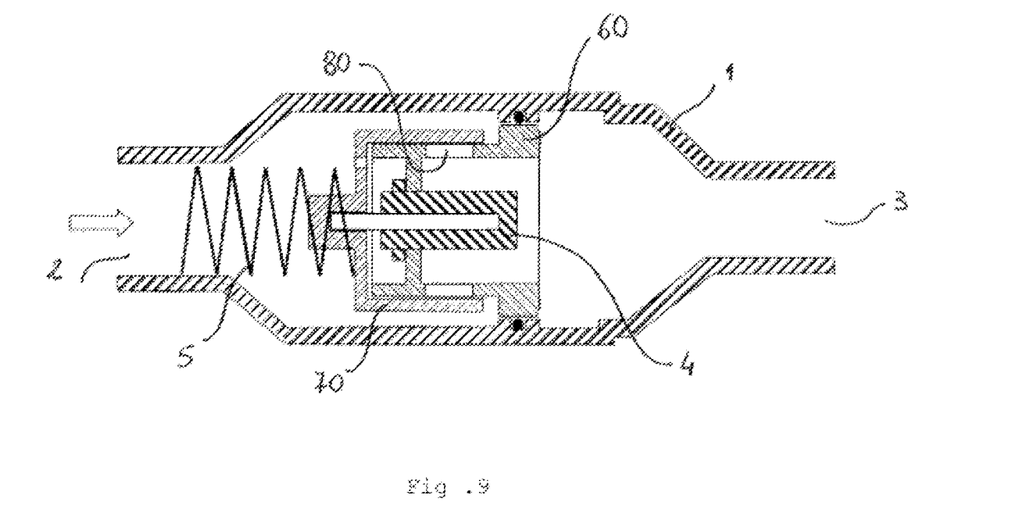
FIGS. 9 and 10 show a variant of the invention.
Figure 10:
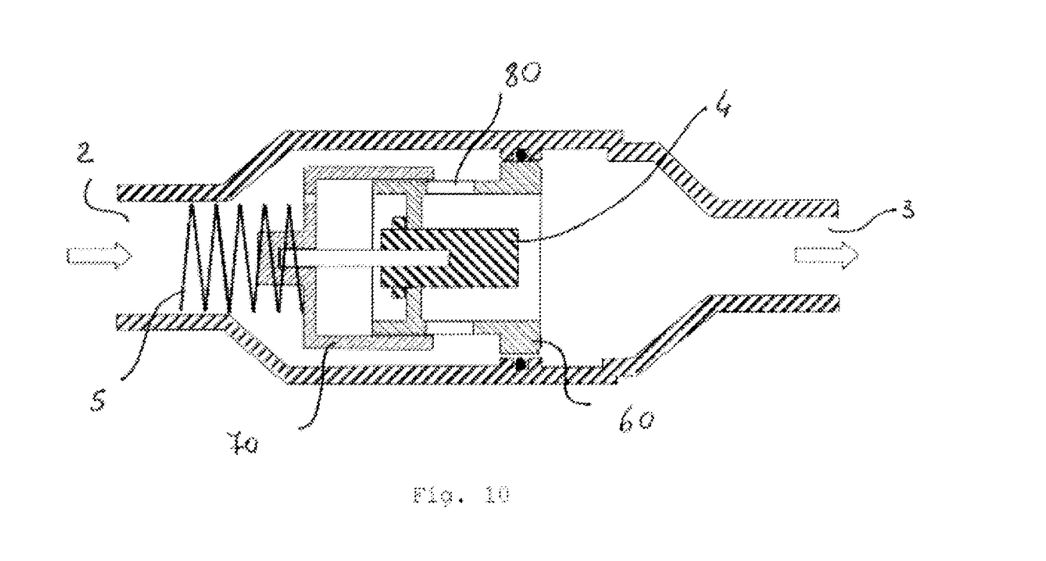

Alternatively, as shown in FIGS. 9 and 10, the movable cage 70 may be disposed outside the fixed cage 60 if the pressure comes from the side of the first opening 2.

The movable cage 7, 70 is thus always disposed between the pressure and the fixed cage 6, 60. Thus, under the effect of the pressure, the movable cage 7, 70 is pressed against the fixed cage 6, 60. Because of its flexibility, under the effect of this pressure, the movable cage 7, 70 can be deformed so as to match the shapes of the fixed cage 6, 60, reduce any possible clearances between the movable cage 7, 70 and the fixed cage 6, and thus improve the sealing between them.

The flexibility of the movable cage 7, 70 can be obtained by any means. A first means consists in choosing a material intrinsically more flexible than that of the fixed cage.

Figure 3:
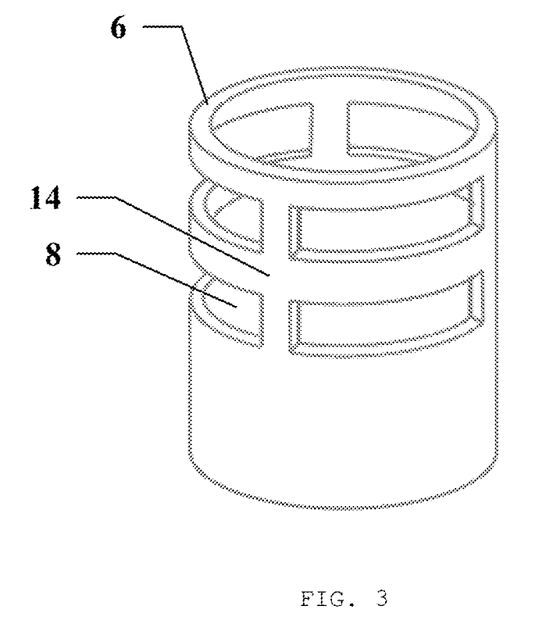
FIG. 3 shows in a perspective view a fixed cage according to an embodiment of the invention.
Figure 4:
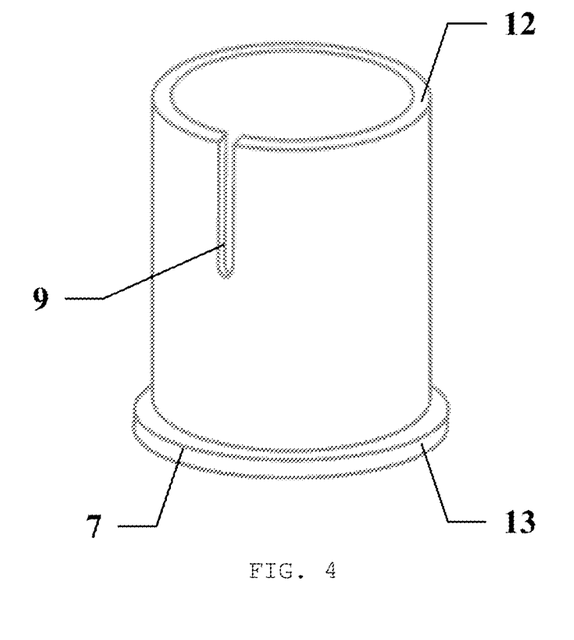
FIG. 4 shows in a perspective view a movable cage according to an embodiment of the invention.
Figure 5:
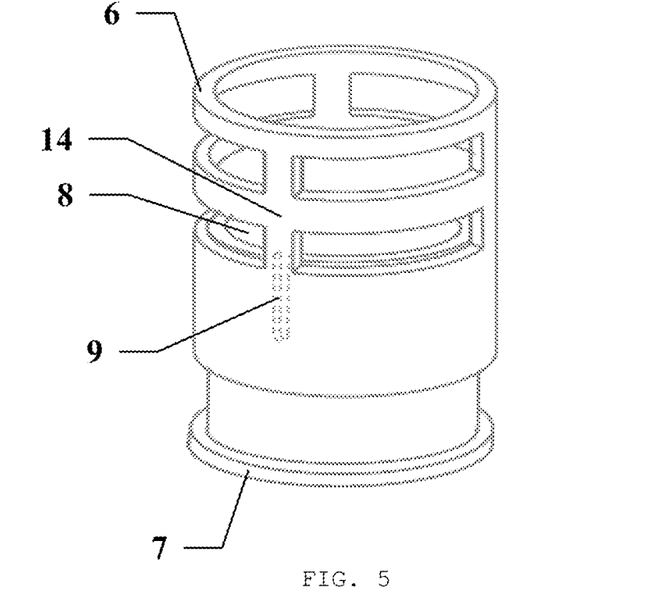
FIG. 5 shows in a perspective view, the movable cage and the fixed cage of the two previous figures when assembled.

Another means, complementary or alternative to the previous one, to obtain flexibility of the plunger 7, is to provide it with at least one longitudinal cutout 9. Thus, this/these cutout(s) being longitudinal, it/they will enable the plunger 7, under the pressure action, to deform and to increase or decrease its section, in order to adapt it to the section of the fixed cage 6. Advantageously, the longitudinal cutout(s) 9 are preferably disposed in the area of the aperture(s) 8, an area characterized in that sealing is particularly pursued. For the longitudinal cutout(s) 9 not constituting an opening allowing the fluid to pass, the fixed cage 6 advantageously comprises at least one solid surface 14 facing each of said longitudinal cutouts 9. In other words, the longitudinal cutout(s) 9 are not disposed opposite an aperture 8. An embodiment of the plunger 7 and of the fixed cage 6 meeting these features is illustrated in FIGS. 3, 4 and 5.

The longitudinal cutout(s) 9 are advantageous in two ways. In addition to the previously described function of allowing making the movable cage 7, 70 more flexible, this or these longitudinal cutout(s) 9 also offer an anti-jamming function. Indeed, both the movable cage 7, 70 and the fixed cage 6, 60, when they are made by molding, inevitably have a draft angle necessary for demolding and conferring a taper thereto. Even though it can be very weak, and even because of its weakness, this conicity leads in a known manner (see Morse taper), to a risk of jamming. In this instance, such a jamming is detrimental in that it results in a significant increase in the valve opening force, which force the thermostatic actuator would have produce 4. However, the presence of at least one longitudinal cutout 9 advantageously eliminates this risk of jamming.

It has been seen that the movable cage 7, 70 and/or the fixed cage 6, 60 have frustoconical shapes. According to an advantageous embodiment, these conicities are oriented in the same direction so that the shapes of the movable cage 7, 70 and the opposite fixed cage 6 are substantially complementary.

Figure 6:
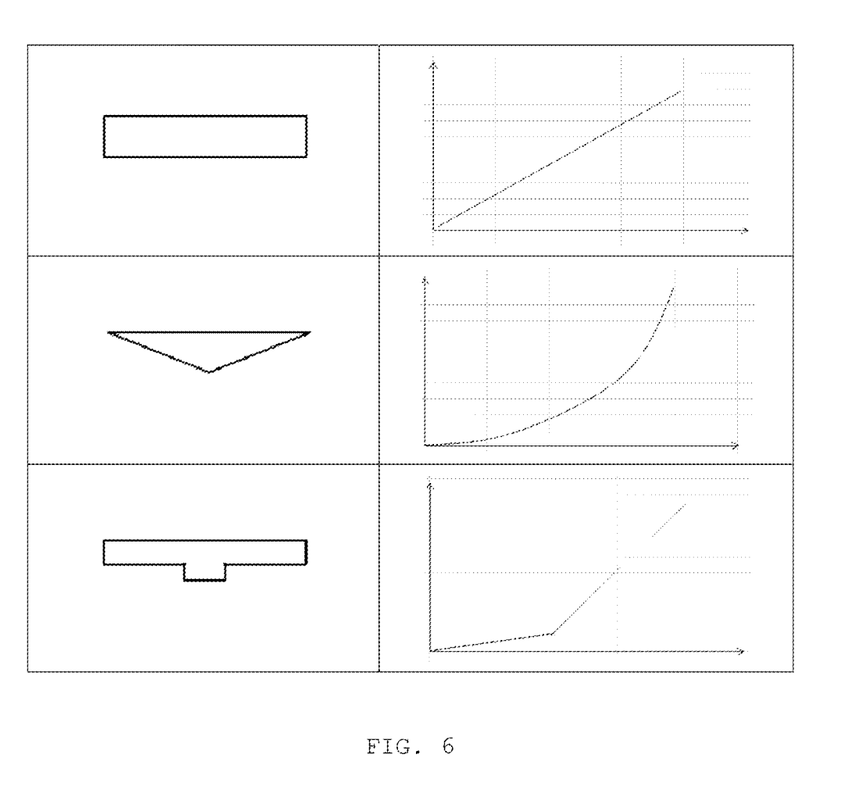
FIG. 6 shows three illustrative shapes of apertures, and the corresponding flow rate laws.

During the translational movement of the plunger 7, 70 relative to the fixed cage 6, 60, an aperture 8, 80 is gradually uncovered. Also, the shape of an aperture 8, 80, and quite particularly its profile in the longitudinal direction, aligned with said translational movement, determines a flow rate law throughout the thermostatic valve as a function of the stroke of the movable cage 7, 70. Also, an advantage of the invention that is easy to conceive is to achieve a given flow rate law by defining the shape of the aperture(s) 8, 80. FIG. 6 thus illustrates several examples of aperture shapes 8, 80 with regards to the obtained features of the flow rate law. Thus, for a rectangular aperture 8, 80 (at the top), namely with a constant longitudinal section, the flow rate law is proportional or linear. For a triangular aperture 8 (in the middle), namely with a continuously increased longitudinal section (respectively decreased for an inverted triangle), the flow rate law is continuously varied. For a stepped aperture 8, 80 (at the bottom), either with a stepped longitudinal section or increasing in steps, the flow rate law is stepped, with variable slopes in steps.

It should be noted that sealing of the thermostatic valve is mainly pursued when it is in the closed position. Also according to another feature, more particularly illustrated in FIGS. 7 and 8, sealing can also be achieved statically through an arrangement applying in this closed position. For this purpose, the thermostatic valve also comprises a first static sealing means 10, disposed, preferably axially, between the fixed cage 6 and a first end 12 of the plunger 7 and a second static sealing means 11, disposed, preferably axially, between the fixed cage 6 and an opposite second end 13 of the plunger 7. These two static sealing means are disposed so as to ensure a static sealing, between the movable cage 7 and the fixed cage 6, when the movable cage 7 is in the closed position. Each of the static sealing means 10, 11 may be of any type adapted to ensure such sealing when axially compressed. It may thus be an O-ring gasket or any other equivalent type.

Figure 7:
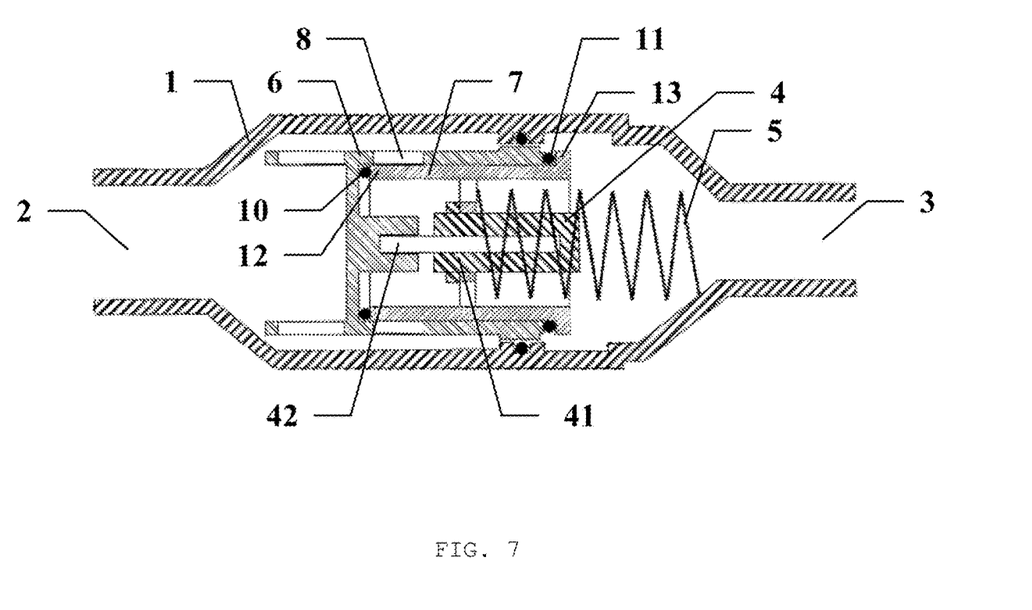
FIG. 7 shows in a schematic sectional view a thermostatic valve according to a second embodiment of the invention, in the closed position.
Figure 8:
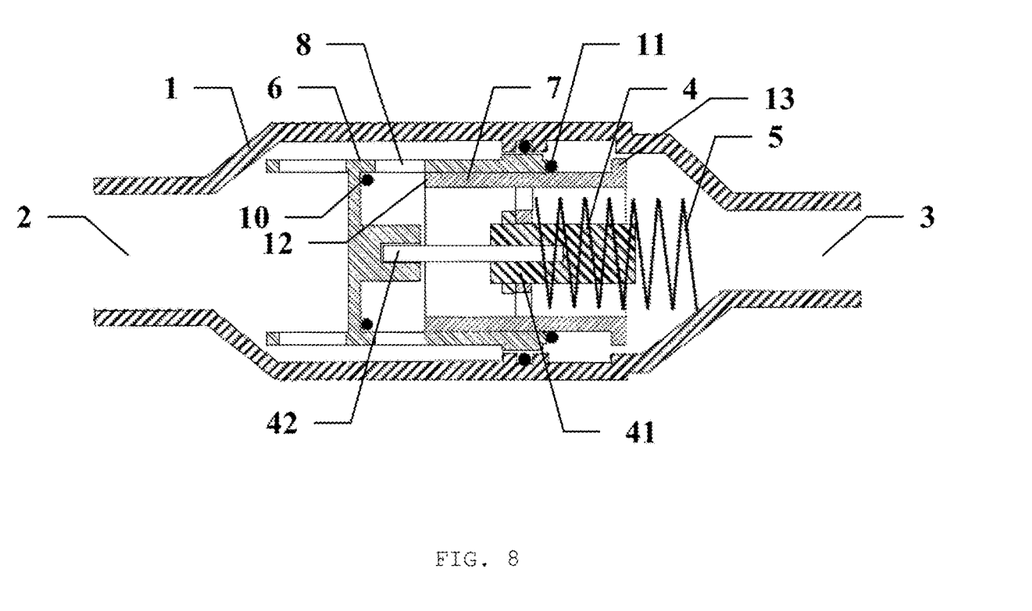
FIG. 8 shows the thermostatic valve of the previous figure in the open position.

This feature requires considerable accuracy and quality of production since the movable cage 7 must, at the end of the closure stroke, compress the two sealing means 10, 11 substantially simultaneously against the fixed cage 6.

This feature for obtaining sealing, may be an alternative to the other features for obtaining sealing: flexibility of the plunger and/or longitudinal cutouts, or be complementary thereto.

Figure 11:
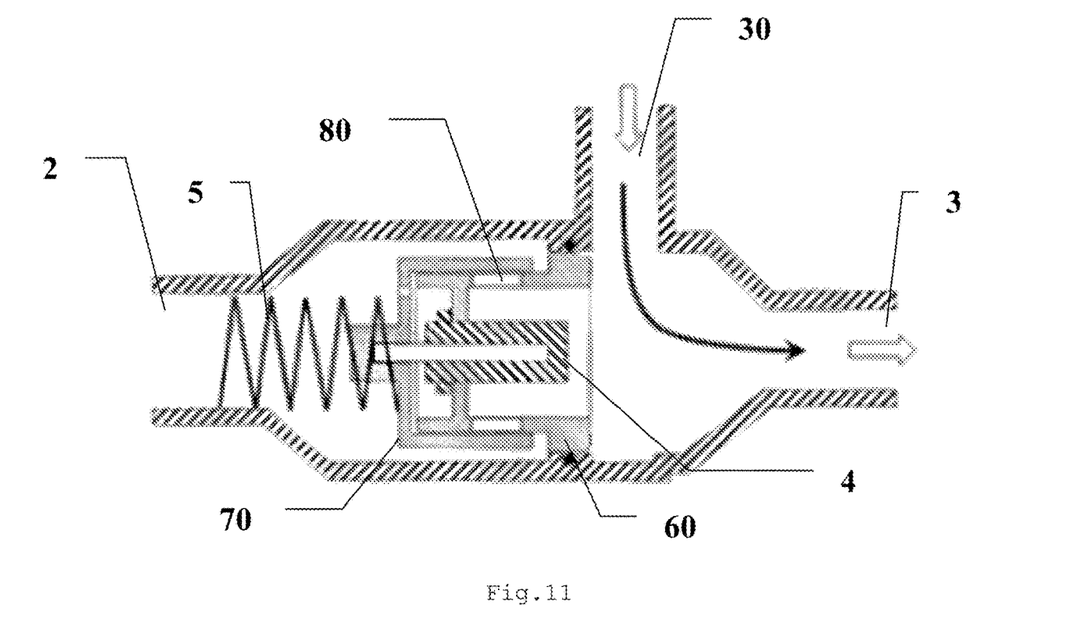
FIGS. 11 and 12 show another variant of the invention.
Figure 12:
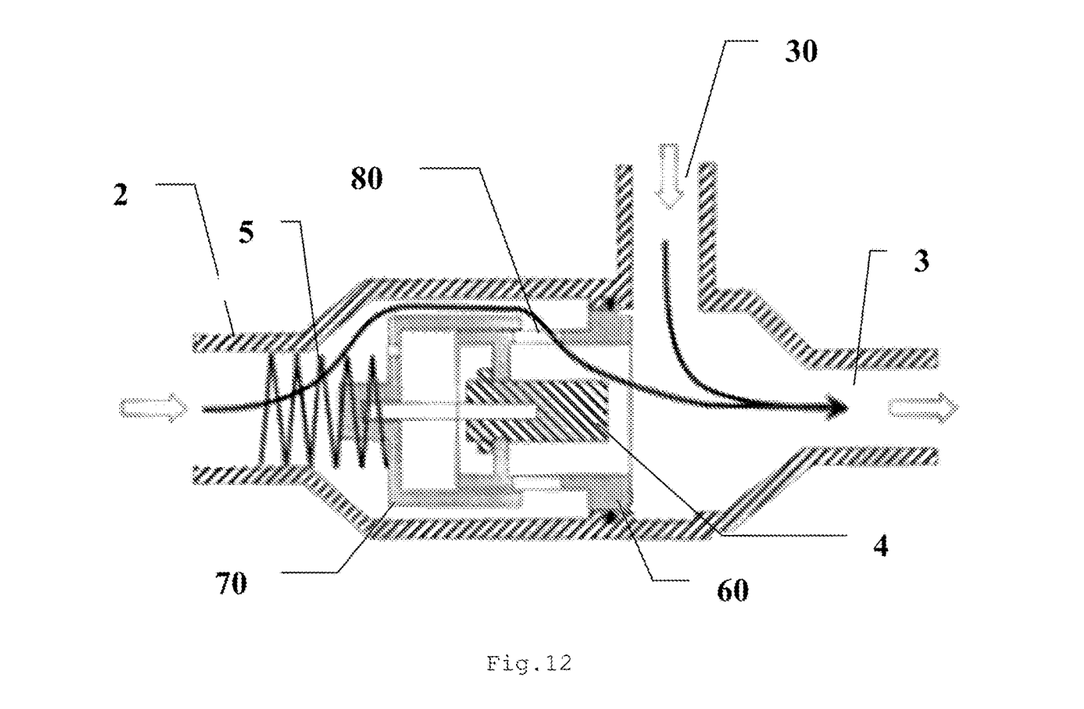

FIGS. 10 and 11 show respectively in the closed and open positions another variant of the invention in which the body 1 comprises in its downstream portion (with respect to the flow direction of the fluid) two conduits, namely an outlet conduit 3 and an inlet conduit 30. The outlet conduit 3 is permanent whereas the inlet conduit 30 will flow more or less depending on whether the valve is open or closed. The flow rate circulating in the inlet conduit 30 is useful for bringing information on the water temperature, when in the closed condition of the thermostatic valve, which will activate the thermostatic valve and enable the passage of fluid throughout the valve.

The invention claimed is:

1. A thermostatic valve for a fluid circuit of a motor vehicle, comprising:
   a hollow body;
   a first opening and a second opening leading into the hollow body;
   a plug separating the first opening from the second opening;
   a thermostatic actuator adapted to open the plug; and
   a biasing member adapted to close the plug, wherein the plug comprises a movable cage made of plastic material and adapted to slide relative to a fixed cage along an axis substantially coincident with an axis of the thermostatic actuator, the movable cage or the fixed cage having at least one aperture, wherein relative displacement of the movable cage relative to the fixed cage allows for selectively sealing or clearing of the at least one aperture, wherein the movable cage comprises at least one longitudinal cutout extending through an annular wall of the movable cage, the annular wall being substantially coincident with the axis of the thermostatic actuator and the fixed cage comprises a solid surface opposite the at least one longitudinal cutout such that no fluid passes through the at least one longitudinal cutout.

2. The thermostatic valve according to claim 1, wherein the movable cage is more flexible than the fixed cage and is disposed, with respect to the fixed cage, on a pressure side, so that pressure on the pressure side presses the movable cage against the fixed cage.

3. The thermostatic valve according to claim 1, wherein the body further comprises a conduit configured to be connected to the fluid circuit, the conduit extending downstream from the thermostatic actuator.

4. The thermostatic valve according to claim 1, wherein the fixed cage and the movable cage have substantially complementary frustoconical shapes.

5. The thermostatic valve according to claim 1, wherein the movable cage is engaged on an internal face of the fixed cage and in that the fixed cage is provided with the at least one aperture.

6. The thermostatic valve according to claim 1, wherein the movable cage is engaged on an external face of the fixed cage and in that the fixed cage is provided with the at least one aperture.

7. The thermostatic valve according to claim 1, wherein the at least one aperture is shaped to achieve a desired flow.

8. The thermostatic valve according to claim 7, wherein the at least one aperture is one of the following: rectangular in shape, triangular in shape and stepped.

9. The thermostatic valve according to claim 1, wherein the valve also comprises a first static sealing means, disposed between the fixed cage and a first end of the movable cage and a second static sealing means, disposed axially, between the fixed cage and an opposite second end of the movable cage, so as to ensure a static sealing when the movable cage is in a closed position.

10. A fluid inlet or fluid outlet case for thermostatic regulation of a fluid circuit, wherein the fluid inlet or the fluid outlet case comprises a thermostatic valve according to claim 1.

11. The thermostatic valve according to claim 2, wherein the body further comprises a conduit configured to be connected to the fluid circuit, the conduit extending downstream from the thermostatic actuator.

12. The thermostatic valve according to claim 11, wherein the fixed cage and the movable cage have substantially complementary frustoconical shapes.

13. The thermostatic valve according to claim 12, wherein the movable cage is engaged on an internal face of the fixed cage and in that the fixed cage is provided with the at least one aperture.

14. The thermostatic valve according to claim 13, wherein the movable cage is engaged on an external face of the fixed cage and in that the fixed cage is provided with the at least one aperture.

15. The thermostatic valve according to claim 14, wherein the at least one aperture is shaped to achieve a desired flow.

16. The thermostatic valve according to claim 15, wherein the at least one aperture is one of the following: rectangular in shape, triangular in shape and stepped.

17. The thermostatic valve according to claim 16, wherein the valve also comprises a first static sealing means disposed, between the fixed cage and a first end of the movable cage and a second static sealing means, disposed between the fixed cage and an opposite second end of the movable cage, so as to ensure a static sealing when the movable cage is in a closed position.

18. The thermostatic valve according to claim 2, wherein the body further comprises a conduit configured to be connected to the fluid circuit, the conduit extending downstream from the thermostatic actuator.

19. The thermostatic valve according to claim 1, wherein the at least one aperture is located in the annular wall of the movable cage or an annular wall of the fixed cage.

* * * * *